Apr. 10, 1923.
L. M. WOOLSON
HYDROCARBON MOTOR
Filed Oct. 2, 1919
1,451,035
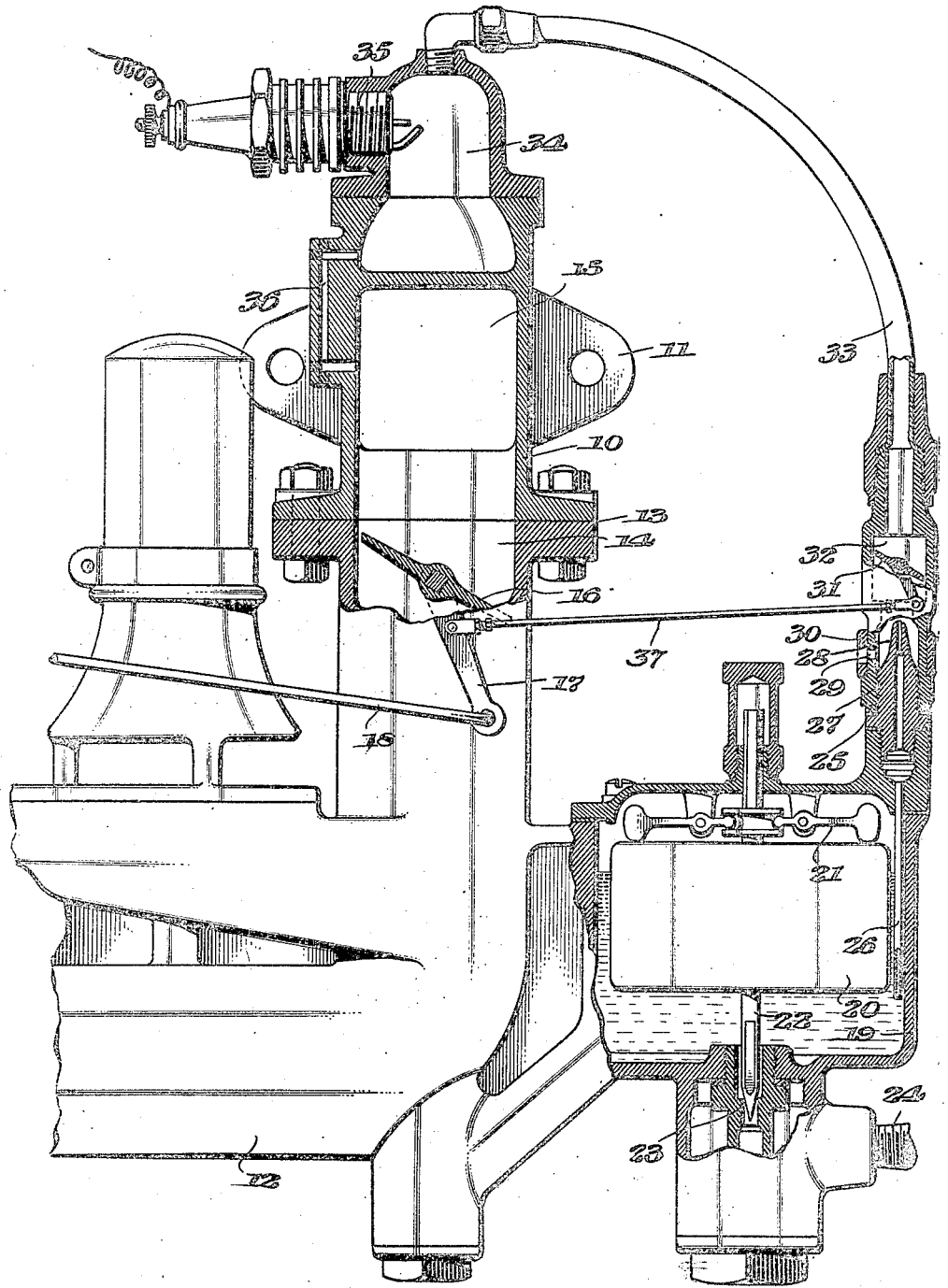
Inventor,
Lionel M. Woolson,
By Milton Sibbett Atty.

Patented Apr. 10, 1923.

1,451,035

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed October 2, 1919. Serial No. 328,029.

*To all whom it may concern:*

Be it known that I, LIONEL M. WOOLSON, a citizen of the United States, and resident of Detroit, Wayne County, State of Michigan, have invented certain new and useful Improvements in Hydrocarbon Motors, of which the following is a specification.

This invention relates to hydrocarbon motors and particularly to means for heating the mixture passing from the carburetor to the motor.

The invention is particularly adapted for motors using low grades of fuel, even as low as kerosene.

One of the objects of the present invention is to provide a heating means for the mixture of a hydrocarbon motor such that the amount of heat will be increased as the quantity of mixture supplied to the motor is increased.

Another object of the invention is to provide a combustion heater for the mixture of a hydrocarbon motor and controlling means therefor which will increase the supply of mixture to the combustion heater as the quantity of mixture is increased to the motor.

Another object of the invention is to provide a combustion heater for the mixture of a hydrocarbon motor with means for increasing and decreasing the amount of mixture supplied to the combustion heater, which latter means is controlled either manually or in relation to some other variable part of the motor.

Other objects of the invention will appear from the following description taken in connection with the drawing which forms a part of this specification and in which the figure is a vertical section in part elevation through the intake showing an illustrative form of the invention.

Referring to the drawing, 10 represents a motor intake pipe which may be secured to the motor as by the ears 11. A carburetor 12 is connected to the intake pipe 10 as by the flange and bolt connection 13.

The carburetor 12 may be of any suitable form adapted to supply a suitable mixture of gasoline or kerosene or other fuel, and air, to the motor. Its upper part and the intake pipe or header 10 above referred to form a passage 14 for the mixture which passes through the outlet 15 into the motor. Arranged in this passage 14 is a throttle valve 16 which may be operated by an arm 17 and a rod 18. This throttle valve constitutes one of the mixture controlling means of the motor since it controls the quantity of mixture passing to the motor.

For determining the level of liquid fuel in the carburetor 12 a float chamber 19 is connected to the carburetor and provided with a float 20 and weighted levers 21 operating on a valve 22 which controls the passage 23 from the main fuel supply pipe 24.

Said float chamber 19 may also supply a second carburetor 25 which is preferably much smaller than the carburetor 12 and is adapted to supply a small amount of mixture for heating the mixture passing from the main carburetor to the motor. This carburetor 25 has a small fuel tube 26 extending down into the float chamber 19 and a nozzle 27 which is surrounded by an air passage 28 having one or more inlet ports 29 controlled or adjusted by a sleeve 30 surrounding the body of the carburetor at that point. A throttle valve 31 is arranged in the passage 32 above the nozzle 27 and is thereby adapted to regulate or control the supply of mixture passing from the carburetor to a pipe 33 which leads to a chamber 34 mounted upon or connected to the intake pipe 10 above referred to. The chamber 34 is shown in heating relation to the intake pipe 10 and a spark plug 35 or other suitable igniter is arranged in the chamber so that the mixture which enters the chamber may be fired to produce the required heat. The chamber 34 has an outlet to the interior of the intake pipe 10, a passage 36 of circuitous form being provided for that purpose. Thus the chamber 34 is under suction from the motor and thus the charge of mixture is drawn into the chamber from the carburetor 25. The burnt gases from the chamber 34 are also thus discharged directly into the intake pipe 10 and there mix with the main supply of mixture passing from the carburetor 12 to the motor. This tends further to heat the latter mixture and thereby assist in volatilization of the liquid fuel.

As carburetors 12 and 25 are both under suction from the motor, when the motor is turned over for starting, mixture will be drawn from both carburetors and the heating action will at once start in the chamber 34. This will assist in vaporizing the mixture in the intake pipe 10 and thus assist in starting and warming up the motor. If low grades of fuel are used, or even with the better grades in cold weather, it is essential that a greater amount of heat shall be supplied to the mixture from the main carburetor under certain conditions as when the amount or quantity of that mixture is increased. Thus as the throttle valve 16 is opened it is desirable to increase the heating capacity of the combustion heater. To bring about this result the throttles 16 and 31 are interconnected as by rod 37 so that as the throttle 16 is opened to increase the supply of mixture from the main carburetor 12, the throttle 31 is also opened to a similar degree for increasing the supply of mixture from the carburetor 25. Likewise, as the throttle 16 is closed, the throttle 31 will move simultaneously with it to cut down the mixture supply from the carburetor 25 and consequently cut down the heat supplied by the combustion chamber 34.

Other forms of devices than that shown may be made without departing from the spirit or scope of the invention.

Having thus described my invention, what I claim and desire to secure by Letters Patent is:

1. The combination with the mixture conduit of a hydrocarbon motor, of a main carburetor for supplying mixture thereto, an independent secondary carburetor connected to said conduit, means for igniting the mixture from said secondary carburetor before it reaches said conduit to thereby heat the main carburetor mixture in said mixture conduit, and interconnected throttle valves between the carburetors and said mixture conduit.

2. The combination with the mixture conduit of a hydrocarbon motor, of main and auxiliary carburetors connected to said conduit, means for igniting the mixture from the auxiliary carburetor to heat the mixture from the main carburetor, and throttle valves for controlling the mixtures from both said carburetors, the throttle valve for the mixture from the auxiliary carburetor being between that carburetor and the igniting means.

3. The combination with the mixture conduit of a hydrocarbon motor, of main and auxiliary carburetors connected to said conduit, means for igniting the mixture from the auxiliary carburetor to heat the mixture from the main carburetor, and interconnected throttle valves for simultaneously increasing or decreasing the supply of mixture from both said carburetors.

4. In a hydrocarbon motor, the combination with the mixture conduit thereof, of means for supplying mixture thereto, a combustion heating device for heating said mixture, means for supplying mixture to said device, and means for increasing the mixture opening to said combustion heating device in proportion to the amount of mixture supplied to the mixture conduit.

5. In a hydrocarbon motor, the combination with the mixture conduit thereof, a throttle valve in said conduit, and means for supplying mixture to said conduit, of a combustion heating device subject to the suction of said conduit above said throttle valve, and means for supplying said device with mixture, the size of the passage from said latter means to said device being controlled by the throttle valve opening.

6. In a hydrocarbon motor, the combination with main and auxiliary carburetors connected to the motor intake passage and subject to the suction of the motor, of interconnected throttle valves for the motor from both of said carburetors, and means for igniting the mixture from one of said carburetors before it reaches the motor.

7. In a hydrocarbon motor, the combination with the mixture conduit thereof, of a carburetor for supplying mixture to said conduit, a movable mixture controlling means, a combustion heating device for heating said mixture, a conduit for supplying mixture to said heating device, and means for increasing or decreasing the mixture opening to said heating device with the variable movements of said mixture controlling means.

8. In a hydrocarbon motor, the combination with the mixture conduit thereof, of a carburetor for supplying mixture thereto, a combustion heater device for heating said mixture, a conduit for supplying mixture to said device and having a throttle valve therein and controlling the passage through the conduit, a throttle valve in said mixture conduit, and interconnecting means for opening and closing the throttles together.

9. In a hydrocarbon motor, the combination with the mixture conduit thereof, of a carburetor for supplying mixture to said conduit, a combustion heater device for heating said mixture, a conduit for supplying mixture to said device, and means for simultaneously increasing or decreasing the supply of mixture to the mixture conduit and said device.

10. In a hydrocarbon motor, the combination with the mixture conduit thereof, of a carburetor for supplying mixture to said conduit, a combustion heater device for heating said mixture, a conduit for supplying mixture to said device, and interconnecting throttle valves for both mixtures.

In testimony whereof I affix my signature.

LIONEL M. WOOLSON.